United States Patent [15] 3,660,735
McDougall [45] May 2, 1972

[54] COMPLEMENTARY METAL INSULATOR SILICON TRANSISTOR PAIRS

[72] Inventor: John D. McDougall, Williamstown, Mass.

[73] Assignee: Sprague Electric Company, North Adams, Mass.

[22] Filed: Sept. 10, 1969

[21] Appl. No.: 856,747

[52] U.S. Cl. ..........................317/235 R, 148/1.5, 317/235 G
[51] Int. Cl. ..........................H01l 19/00
[58] Field of Search ..........................317/235

[56] References Cited

UNITED STATES PATENTS

| | | | |
|---|---|---|---|
| 3,456,169 | 7/1969 | Klein | 217/235 |
| 3,388,009 | 6/1968 | King | 317/235 |
| 3,461,361 | 8/1969 | Delivorias | 317/235 |
| 3,472,712 | 10/1969 | Bower | 317/235 |
| 3,475,234 | 10/1969 | Kerwin et al. | 317/235 |

OTHER PUBLICATIONS

Electronics, " Electronic Review" Vol. 41, No. 22 page 49 Oct. 28, 1968

*Primary Examiner*—Jerry D. Craig
*Attorney*—Connolly and Hutz, Vincent H. Sweeney, James Paul O'Sullivan and David R. Thornton

[57] ABSTRACT

A complementary metal-insulator-silicon transistor pair of the field effect type with self-registered gates is produced by introducing doped regions into limited areas of a semiconductive body by ion beam implantation through insulative films overlying the surface of the semiconductor, followed by temperature annealing in order to repair radiation damage caused by the ion beam implantation. Ion bombardment enhanced etching of a $Si_3N_4$ layer is used to simplify opening of electrical contact areas.

3 Claims, 9 Drawing Figures

Patented May 2, 1972 3,660,735

2 Sheets-Sheet 1

COMPLEMENTARY METAL INSULATOR SILICON TRANSISTOR PAIRS

BACKGROUND OF THE INVENTION

This invention relates to field effect transistors and more particularly to complementary metal-insulator-silicon devices of the field effect type having self-registered gates and hereinafter referred to as CMIST and to methods of making the same.

CMIST's have many advantages and are readily used in the industry because of their low standing power dissipation, high switching speeds and their suitability for high density arrays in integrated circuits. Prior art CMIST's have been formed by diffusion techniques and epitaxy techniques. One of the basic difficulties in forming complementary devices is the formation of both P-enhancement and N-enhancement areas in the same semiconducting substrate. The formation of an N-enhancement region where conduction between source and drain regions is through an N-type conductivity depletion layer formed in a P-type conductivity channel between source and drain regions, poses particular difficulties because of the N-type conductivity layer induced in a P-type semiconductor substrate by a thermal oxide insulative layer grown on the surface of the substrate. A high degree of processing control involving added expense may be utilized to eliminate the N-type conductivity layer induced by the thermal oxide insulative layer thereby permitting the production of N-enhancement regions and complementary devices.

A further problem in formation of complementary structures with P-enhancement and N-enhancement areas in the same semiconducting substrate, by prior art epitaxy and diffusion techniques involves the operations of growing separate gate oxides for the two transistor types. It is difficult by diffusion to control the required low concentration of dopants under the gate insulators. A further disadvantage with the epitaxial techniques is that often the selected area epitaxy operation is a low yield expensive process.

Therefore it is an object of this invention to overcome the foregoing and related disadvantages of the prior art.

Another object of this invention is to produce a CMIST by the process of ion implantation thereby simplifying the high degree of processing control required by prior art techniques.

A further object of this invention is to produce a CMIST with a lightly "doped" P-type conductivity pocket within an N-type conductivity substrate, the pocket being induced through an oxide layer by ion implantation.

An even further object of this invention is to produce a CMIST with improved high frequency characteristics due to more precisely aligned self-registered gates which are formed by ionically implanting the source and drain regions and using the gates themselves as the dopant mask.

The last object of this invention is to form a CMIST by lower temperature processing than that used in prior art techniques.

SUMMARY OF THE INVENTION

A complementary metal insulator silicon field effect transistor pair with self-registered gates comprises a silicon substrate upon which an insulative silicon dioxide layer is thermally grown and overlaid with a silicon nitride layer protecting the oxide layer from further contamination. An N-enhancement area is produced in the same substrate by the ionic implantation of impurity ions through the silicon dioxide and silicon nitride layers to form a P-type conductivity pocket within the silicon substrate. A deposited gate metal serves as a mask defining the edges of the ionically implanted source and drain regions in both the P-enhancement and N-enhancement regions of the CMIST. During ionic implantation, of impurities, the edge of the mask defines the lateral spread of the source and drain regions thereby establishing a precisely aligned self-registered gate with less parasitic capacitance and higher frequency capability.

The oxide and nitride layers are photoetched to expose the ohmic contact regions. Etching of the silicon nitride layer is enhanced by ion beam bombardment. High temperature annealing in hydrogen lowers the surface state density of the CMIST thereby establishing a lower threshold voltage.

Ionic implantation of the P-pocket through the oxide layer simplifies the process of forming complementary MIST's thereby reducing the costs of manufacturing CMIST's.

DESCRIPTION OF THE PREFERRED EMBODIMENT

Figure 1:
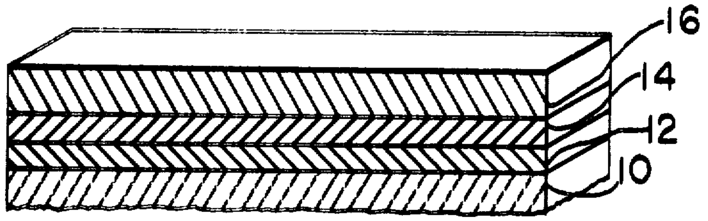
FIG. 1 shows a cross-section perspective view of a silicon body overlain by a layer of thermally grown silicon dioxide, a layer of silicon nitride and a layer of pyrolytic oxide.

The process of forming complementary CMIST's by ion implantation in silicon planar processing by this preferred embodiment begins with the thermal oxidation of an N-type conductivity silicon substrate having a resistivity in the order of 10Ω-cm, as shown in FIG. 1 to form 700 A. units thick $SiO_2$ film, 12 overlaying silicon substrate 10. $Si_3N_4$ film 14, is next deposited at 850° C. on $SiO_2$ film 12, to an order of 600 A. units thick and then overlaid at 750° C. with 4 KA. units thick $SiO_x$ film 16, both films being deposited by pyrolytic decomposition. This pyrolytic oxide film is used to space the ohmic contacts for the source and drain away from the silicon thereby reducing parasitic capacitance. This process has the advantage of initially forming the $SiO_2$ film which will subsequently be patterned to form the critical gate oxides. The gate oxides are shielded against subsequent metallic contaminants by the silicon nitride film 14.

Figure 2:
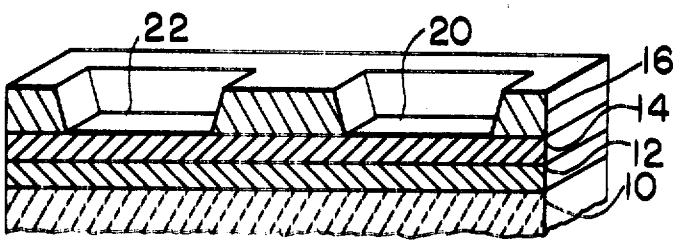
FIG. 2 shows a cross-section perspective view of the structure of FIG. 1 with spaced openings formed in the pyrolytic oxide layer.

The next step in the process is illustrated by FIG. 2. The $SiO_x$ film 16 is masked and etched through by standard photolithographic techniques in order to expose rectangular areas 20 and 22 which correspond to the N-enhancement and P-enhancement areas respectively of the CMIST. Since the nitride layer etches slowly in glass ($SiO_2$) etches, the initial thickness of the $SiO_2$-$Si_3N_4$ gate insulator is precisely maintained.

Figure 3:
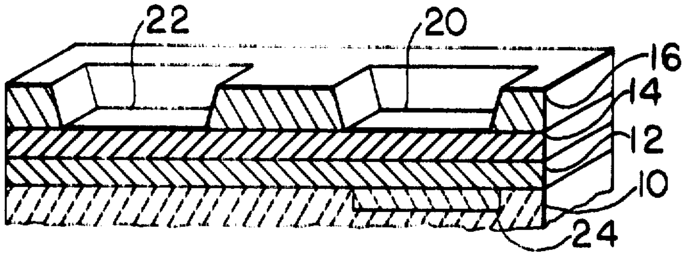
FIG. 3 shows a cross-section perspective view of the structure of FIG. 2 with an ionically implanted region in the silicon body.

After the rectangular areas 20 and 22 have been exposed, the N-enhancement square 20, is implanted through the $Si_3N_4$ and $SiO_2$ films with boron ions to form P-pocket 24 in N-type silicon substrate 10 as shown in FIG. 3. The equipment used to perform the implantations and to control exposure of the semiconductor is described as follows. First an ion source forms nearly mono-energetic positive ions which are extracted, accelerated and focused at a detector by four cylindrical electrodes. A mass analyzer and a final slit reject all but the desired dopant ions which in this instance would be boron ions. Uniform, large area exposure of the substrate is accomplished by electrically sweeping the ion beam across the substrate while moving the substrate in a direction perpendicular to that of the beam sweep. The beam current is determined by a Faraday cup detector and the ion dose is determined by the current and the exposure time and area. The lateral area of the P-pocket is defined by a standard metal mask which may be either in contact or out of contact with $SiO_x$ film 16. The P-pocket is implanted within a silicon substrate 10 oriented in the <111> direction with 55 kilo electron volt (Kev) boron ions, $^{11}B^+$, to a dose in the order of $5 \times 10^{12} - 2 \times 10^{13}$ ions/cm$^2$ to produce junctions in the order of 0.3 to 0.4 microns below the substrate surface. The next step in the process is to anneal the entire structure in a dry nitrogen ambient at 1,130° C. for 30 minutes in order to form a uniform lightly doped P-pocket. After this high temperature anneal, the P-type conductivity impurities are diffused so as to form junctions in the order of 1 to 2 microns below the substrate surface.

Figure 4:
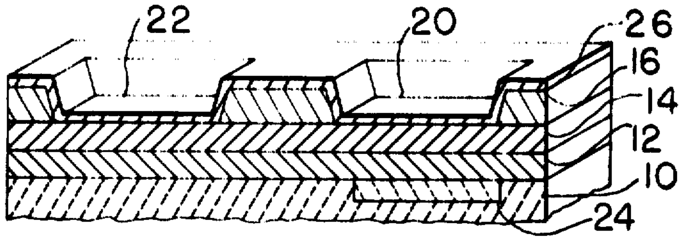
FIG. 4 shows a cross-section perspective view of the structure of FIG. 3 with a metal layer overlying the upper surface.

After the P-pocket has been ionically implanted, the process continues with the deposition of 2.5 KA. thick, molybdenum metal film 26, overlaying both $SiO_x$ film 16 and the exposed surface of $Si_3N_4$ film 14 as shown in FIG. 4. The molybdenum film is deposited by the process of electron beam evaporation. Molybdenum in this instance is utilized because it is a refractory metal capable of withstanding high temperature annealing. However other suitable non-refractory metals could be utilized due to the lower temperature processing used in ion implantation.

Figure 5:
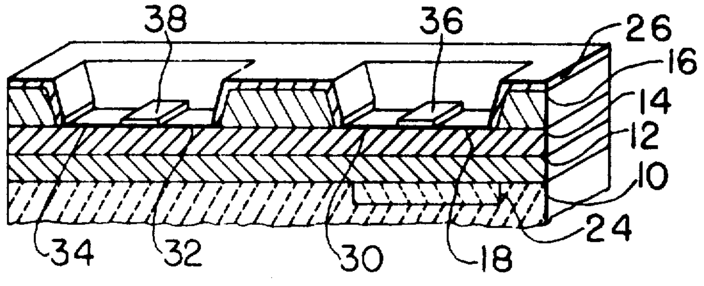
FIG. 5 shows a cross-section perspective view of the structure of FIG. 4 having openings in the metal layer formed to permit access of the ion beam to the silicon body.

Next in order to permit access by the ion beam for implanting the source and drain regions in the N-enhancement and P-enhancement areas, those areas of molybdenum film 26 directly above the source and drain regions are masked and etched away by standard photolithographic techniques exposing the surface of silicon nitride film 14 in regions 28, 30, 32 and 34 as shown in FIG. 5. Regions 36 and 38 of the molybdenum layer which remain after etching form the insulated metal gates for the N-enhancement and P-enhancement areas respectively.

After the molybdenum has been etched so as to form insulated gates, the source and drain regions are implanted through the silicon dioxide and silicon nitride layers by ionic bombardment. A standard ion beam generator as previously discussed is utilized for the ion source. For this procedure the gate metal is used to define the edges of the source and drain regions which are formed either in part or entirely by ion implantation thus establishing self registered gate CMIST with a near perfect alignment of the edges of the gates with the respective edges of the source and drain regions. As a result of using the gate itself as the dopant mask, overlap of the gate metal and the highly doped source and drain regions is eliminated due to almost no lateral diffusion of the implanted ions. This leads to a considerable reduction in the parasitic capacitance of the transistors and thus improved high frequency operation.

Figure 6:
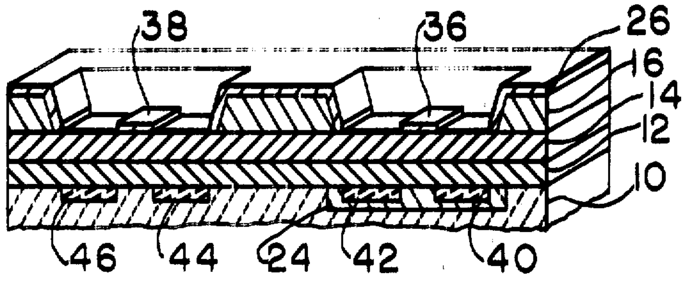
FIG. 6 shows a cross-section perspective view of the structure of FIG. 5 having ionically implanted regions formed in the silicon body at the interface with the thermally grown silicon oxide.

P-enhancement source region 46 and drain region 44 as illustrated in FIG. 6 are implanted with 55 kilo electron volt (Kev) boron ions, $^{11}B^+$, to a dose of $3 \times 10^{14}$ ions/cm$^2$ to produce junctions in the order of 0.3 to 0.4 microns below the substrate surface. N-enhancement source region 42 and drain region 40 as illustrated in FIG. 6 are implanted with 120 kilo electron volt (Kev) phosphorous ions ($31, p^{++}$), to a dose of $3 \times 10^{14}$ ions/cm$^2$ to form junctions 0.15 microns below the previously implanted P-pocket surface. The preferential doping of the P-enhancement devices with boron and the N-enhancement devices with phosphorous is accomplished by the use of either in contact or out of contact metal masks.

After the source and drain regions have been implanted, the silicon oxide and silicon nitride films overlaying these regions must be etched away in order to permit access of ohmic contacts to the source and drain regions. High temperature pyrolytic silicon nitride film 14 is difficult to etch because of its undesirably slow etch rate which is in the order of 40 ± 10 A./min in standard glass etches. Rapid etching is desirable and the etch rate may be increased by a factor of as much as 4 to 5 by ion beam bombardment which changes the etch rate by altering the crystalline and chemical structure of the silicon nitride film. Therefore the areas of the silicon nitride film directly above the source and drain of both P-enhancement and N-enhancement devices are bombarded with 45 kilo electron volt (Kev) argon ions, 40 $A^+$, to a dose in the order of $5 \times 10^{15}$ to $5 \times 10^{16}$ ions/cm$^2$ in order to increase the etch rate of silicon nitride film 14 and thereby facilitate the opening of electrical contacts. The use of ion beam enhanced etching eliminates the use of hot phosphoric acid etching of the $Si_3N_4$ as required in prior art. Protecting the gate metal from the phosphoric acid would be difficult.

Figure 7:
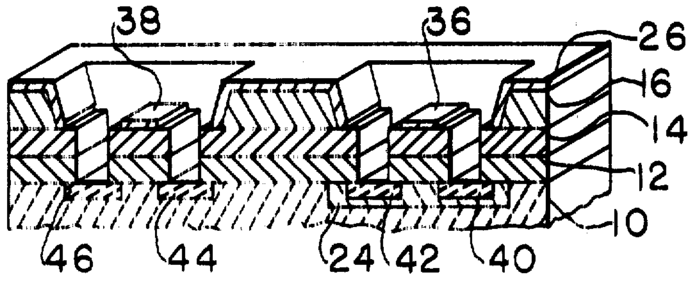
FIG. 7 shows a cross-section perspective view of the structure of FIG. 8 having segments of the nitride and silicon oxide removed to expose portions of the surface of the silicon body over the source and drain regions.
Figure 8:
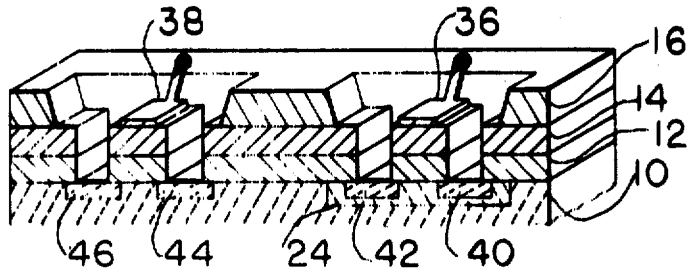
FIG. 8 shows a cross-section perspective view showing contacts attached to the electrodes.
Figure 9:
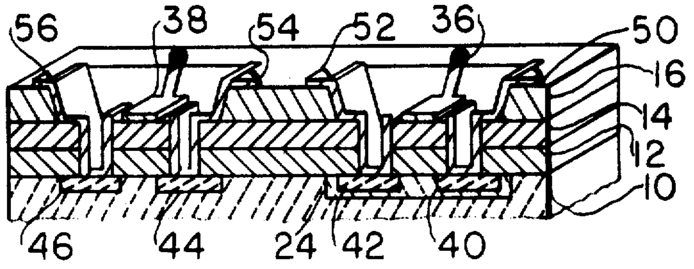
FIG. 9 shows a cross-section pictorial view showing the contacts of the gate electrodes and showing the ohmic contacts to the source and drain regions.

After the argon bombardment, the silicon nitride film and the silicon dioxide film contact areas directly above the source and drain of both P-enhancement and N-enhancement areas are masked and opened with Slo-glass Etch to permit access of ohmic contacts directly onto the surface of source 42 and 46, and drain 40 and 44 as shown in FIG. 7. The structure is then annealed in dry argon for 15 minutes at 800° C. to remove radiation damage and to move the implanted atoms in the source and drain regions to substitutional sites in the silicon lattice. The next process step involves removing the excess molybdenum. The insulated gates 36 and 38 are masked along with extending tabs which form electrical contacts and the remaining molybdenum surface is then etched away by standard photolithographic techniques leaving the structure illustrated by FIG. 8. After the masking and etching process, the structure is annealed in hydrogen for 30 minutes at 800° C. in order to reduce the surface state density which establishes a lower threshold voltage, enhancement mode CMIST.

After annealing, a thin film of aluminum is deposited by evaporation and then masked along the source and drain regions together with extending tabs which form electrical contacts on the surface of $SiO_x$ film 16. The excess aluminum is then etched away by standard photolithographic techniques leaving electrical contacts 50 and 54 from the N-enhancement drain and the P-enhancement drain respectively, together with contacts 52 and 54 from the N-enhancement source and the P-enhancement source respectively. In order to etch the aluminum from the molybdenum insulated gates, 375 ml of $H_3PO_4$, 75 ml Acetic Acid, and 90 ml of $H_2O$ are used at 55° C. The final step involves sintering the structure for 15 minutes in dry argon at 500° C. to form low resistance ohmic contacts on the source and drain regions.

Since it is obvious that many changes and modifications can be made in the above-described details without departing from the nature and spirit of the invention, it is to be understood that the invention is not limited to said details except as set forth in the appended claims.

WHAT IS CLAIMED IS:

1. A pair of complementary metal-insulator- silicon field effect transistors of the enhancement mode type with self-registered gates comprising:

a. a semiconducting silicon substrate of N-type conductivity;

b. an insulating layer comprising a thermally grown silicon oxide overlying said semiconducting substrate;

c. an ionically implanted uniformly lightly doped pocket of P-type conductivity positioned within said substrate and having a surface in the same plane as one surface of said substrate, and where the impurity ions were ionically implanted through said insulating layer;

d. a pair of source and drain regions, the first of which is positioned entirely within said ionically implanted pocket and is of N-type conductivity and the second pair is positioned within that part of said semiconducting substrate entirely without said pocket and is of P-type conductivity;

e. a pair of self-registered metallic gate layers located on said insulating layer; and f. contacts extending from said gate layers and said source and drain regions.

2. The transistor pair of claim 1 in which said silicon oxide insulating layer is overlaid with a protective silicon nitride film.

3. The transistor pair of claim 1 in which the said pair of source and drain regions are ionically implanted with the gate metal serving as the dopant mask and defining the edges of the source and drain regions thereby automatically forming self-registered gates.

* * * * *